United States Patent
Scharbak

(10) Patent No.: US 12,084,028 B2
(45) Date of Patent: Sep. 10, 2024

(54) METHOD FOR THE AUTOMATIC PARAMETERIZATION OF A BRAKING SYSTEM

(71) Applicant: Robert Bosch GmbH, Stuttgart (DE)

(72) Inventor: Rami Scharbak, Benningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 279 days.

(21) Appl. No.: 17/612,705

(22) PCT Filed: May 7, 2020

(86) PCT No.: PCT/EP2020/062715
§ 371 (c)(1),
(2) Date: Nov. 19, 2021

(87) PCT Pub. No.: WO2021/018430
PCT Pub. Date: Feb. 4, 2021

(65) Prior Publication Data
US 2022/0274569 A1    Sep. 1, 2022

(30) Foreign Application Priority Data

Aug. 1, 2019 (DE) .................. 10 2019 211 551.9

(51) Int. Cl.
*B60T 8/1761* (2006.01)
(52) U.S. Cl.
CPC ....... *B60T 8/17616* (2013.01); *B60T 2240/00* (2013.01); *B60T 2270/14* (2013.01)

(58) Field of Classification Search
CPC ............ B60T 8/17616; B60T 2240/00; B60T 2270/14
See application file for complete search history.

(56) References Cited

U.S. PATENT DOCUMENTS

| | | | |
|---|---|---|---|
| 9,207,135 B2 | 12/2015 | Staufer et al. | |
| 2002/0043875 A1 | 4/2002 | Braun | |
| 2005/0140207 A1 | 6/2005 | Goebels et al. | |
| 2012/0010779 A1* | 1/2012 | Staufer | B60T 17/22 701/32.8 |
| 2012/0299369 A1* | 11/2012 | Wieder | B60T 17/221 303/113.1 |

FOREIGN PATENT DOCUMENTS

| | | |
|---|---|---|
| JP | H0699805 A | 4/1994 |
| WO | 2017148842 A1 | 9/2017 |

OTHER PUBLICATIONS

International Search Report for PCT/EP2020/062715, Issued Sep. 2, 2020.

* cited by examiner

*Primary Examiner* — Andrew J Cromer
(74) *Attorney, Agent, or Firm* — NORTON ROSE FULBRIGHT US LLP; Gerard A. Messina

(57) ABSTRACT

In a method for the automatic parameterization of a braking system in a vehicle, a brake pressure profile is predefined as a test run during a test drive operation, and the wheel slip which thereafter arises is ascertained. If the wheel slip is outside a permissible value range, the brake pressure is modified and a new test run is carried out.

14 Claims, 3 Drawing Sheets

METHOD FOR THE AUTOMATIC PARAMETERIZATION OF A BRAKING SYSTEM

FIELD

The present invention relates to a method for the automatic parameterization of a braking system in a vehicle.

BACKGROUND INFORMATION

Braking systems in vehicles may be operated in different operating states, in an antilock mode, among others, which is a brake pressure control to counteract a locking of the wheels and to shorten the braking distance. When adapting the braking system to a particular vehicle type, a multiplicity of parameters must be set by way of the application for the purpose of adapting the different operating modes, such as the antilock mode, in the best possible way specific to the vehicle. To determine the brake parameters, it is necessary that the vehicle is moved and decelerated in many different driving situations, system variables and characteristic values being ascertained and evaluated by sensors. This procedure is time-consuming and requires comprehensive knowledge and experience on the part of the application engineer carrying out the work.

SUMMARY

With the aid of the method according to the present invention, it is possible to automatically carry out the parameterization of a braking system in a vehicle. In accordance with an example embodiment of the present invention, during a test drive operation, a brake pressure profile is predefined as a test run, and the wheel slip which thereafter arises is ascertained at at least one wheel of the vehicle. It is possible to ascertain the wheel slip at only one vehicle wheel as well as to ascertain the wheel slip at multiple wheels or possibly at all wheels of the vehicle. In this connection, the wheel longitudinal slip is defined as the wheel slip.

In the case that a wheel slip value or the gradient of the wheel slip is outside a permissible value range, the point in time in the brake pressure profile is determined, at which the brake pressure or the gradient of the brake pressure is the cause of the impermissible wheel slip value or the impermissible gradient of the wheel slip. This point in time is usually prior to the point in time of the impermissible wheel slip value or the impermissible gradient of the wheel slip.

A modified brake pressure profile is predefined as the new test run, the parameters of the modified brake pressure profile being stored and used to parameterize the braking system, if the wheel slip value or gradient of the wheel slip arising during the new test run is within a permissible value range.

All method steps are carried out automatically. A manual intervention by the application engineer is not necessary in the method according to the present invention.

This procedure has the advantage that a multiplicity of different parameters for setting the braking system may be checked in a short period of time and optimized with regard to usability. The operation takes place automatically and at higher speed than when carried out manually. The parameterization of the braking system is significantly simplified overall.

The method for the automatic parameterization of the braking system preferably relates to the antilock mode of the braking system, in which a locking of the wheels is to be prevented and the braking distance shortened as much as possible. It may also be advantageous to use the method according to the present invention for automatically parameterizing further braking modes, for example for a traction control.

In accordance with an example embodiment of the present invention, the method includes test runs having different brake pressure profiles, which are automatically modified in that a brake parameter is automatically changed. The parameter is established at the ascertained point in time of the brake pressure profile at which the original brake pressure or the gradient of the brake pressure is the cause of the impermissible wheel slip value or the impermissible gradient of the wheel slip. "Cause" is understood to mean that an impermissible value of the wheel slip or the gradient of the wheel slip arises within a time interval, due to the brake pressure or gradient of the brake pressure. For example, if an excessively high wheel slip value is established, which is outside the permissible value range, an excessively high brake pressure value taking place at an earlier time may be identified as the cause. As a remedying measure, the brake pressure profile is thereafter modified, for example the maximum of the brake pressure is reduced, after which a corresponding new brake pressure profile is used as the basis of the test run for ascertaining the wheel slip. If the wheel slip value or the gradient of the wheel slip is within the permissible value range during the new test run, the change of the brake pressure was sufficient. The parameters underlying the brake pressure profile may be stored and used for the application of the braking system with reference to a particular vehicle.

The predefined brake pressure profile may be assigned to a particular wheel rotational speed change/wheel slip combination. Depending on the wheel rotational speed change as a function of the wheel slip, different brake pressure profiles may be predefined, which are each used as the test run and are modified with the aid of the method described above until a brake pressure profile is found, in which permissible values for the wheel slip or the gradient of the wheel slip arise. On the whole, a multiplicity of different brake pressure profiles may be predefined, which each form one test run, each brake pressure profile being assigned to a particular combination of wheel rotational speed change and wheel slip. Because the parameterization is carried out automatically, it is possible to check a large number of different brake pressure profiles as test runs. Multiple adaptations and correspondingly multiple test runs are necessary for each given brake pressure profile until a parameterization is found, which results in permissible wheel slip values or gradients of the wheel slip.

The point in time in the stored brake pressure profile, at which the brake pressure and the gradient of the brake pressure are the cause of the impermissible wheel slip value or the gradient of the wheel slip, may be determined if necessary directly from the brake pressure profile. In the aforementioned example having the impermissibly high wheel slip value, the relevant causal point in time within the brake pressure profile is, for example, at the brake pressure maximum, which may be determined using mathematical methods during an analysis of the brake pressure profile.

Alternatively or additionally, it is also possible to determine the corresponding point in time not from the brake pressure profile itself, but from a system variable other than the brake pressure profile. For example, the activation/deactivation profile of the brake pressure may be considered, which may assume discrete values of 0 (deactivated) and 1

(activated). For example, the transition from activated to deactivated may be sought in the stored brake pressure profile, since it may be assumed in this transition that the brake pressure profile has reached its maximum and is decreasing again. It is thus possible to infer from the activation/deactivation profile of the brake pressure certain points in time which are the cause of impermissible values of the wheel slip or the gradient wheel slip.

According to a further advantageous embodiment of the present invention, the brake pressure and/or the gradient of the brake pressure is/are changed as parameters upon a change of the brake pressure profile. An increase as well as a decrease in the brake pressure or the gradient of the brake pressure is considered. The change takes place automatically, for example changed by a value established as a percentage. With the aid of the changed value, the brake pressure profile resulting therefrom is used as the basis of a new test run, and the wheel slip value or the gradient of the wheel slip is again determined and checked with regard to exceeding the permissible value range.

The predefined brake pressure profile may possibly depend on further characteristic values or system variables. For example, a wheel slip change, i.e., the time derivation of the wheel slip, or an abrupt change in wheel rotational speed, are considered.

The method may be carried out during real vehicle operation on a road. Different braking maneuvers, each having a brake pressure profile as the test run, are performed, and the resulting wheel slip value and/or the gradient of the wheel slip is/are determined. It is furthermore also possible to take into account the coefficient of friction between the wheel and the roadway.

In an alternative embodiment of the present invention, it is also possible that the driving is carried out on a roller dynamometer. Different driving situations having different brake pressure profiles may also be carried out automatically on the roller dynamometer to carry out the desired automatic parameterization of the braking system.

The present invention furthermore relates to a control unit for activating the settable components of the braking system. The method described above is carried out with the aid of the control unit. In addition, sensor signals from one or multiple sensors in the vehicle may be supplied to the control unit, in particular with regard to the ascertainment of the wheel rotational speed and the time derivation of the wheel rotational speed as well as the wheel slip and the time derivation of the wheel slip. Different brake pressure profiles are advantageously stored in the control unit, which are each assigned to a particular wheel rotational speed change/wheel slip combination and are predefined as a test run. The ascertained parameters which are assigned to the modified, permissible brake pressure profiles may also be stored in the control unit.

The present invention furthermore relates to a braking system in a vehicle, which is equipped with a control unit described above. The braking system is, in particular, a hydraulic braking system.

The present invention furthermore relates to a vehicle, which includes a braking system described above.

Finally, the present invention relates to a computer program product, including a program code, which is designed to carry out the method steps described above. The computer program product runs in the control unit described above.

Additional advantages and advantageous embodiments are derived from the description of the figures, and the figures.

DETAILED DESCRIPTION OF EXAMPLE EMBODIMENTS

Figure 1:
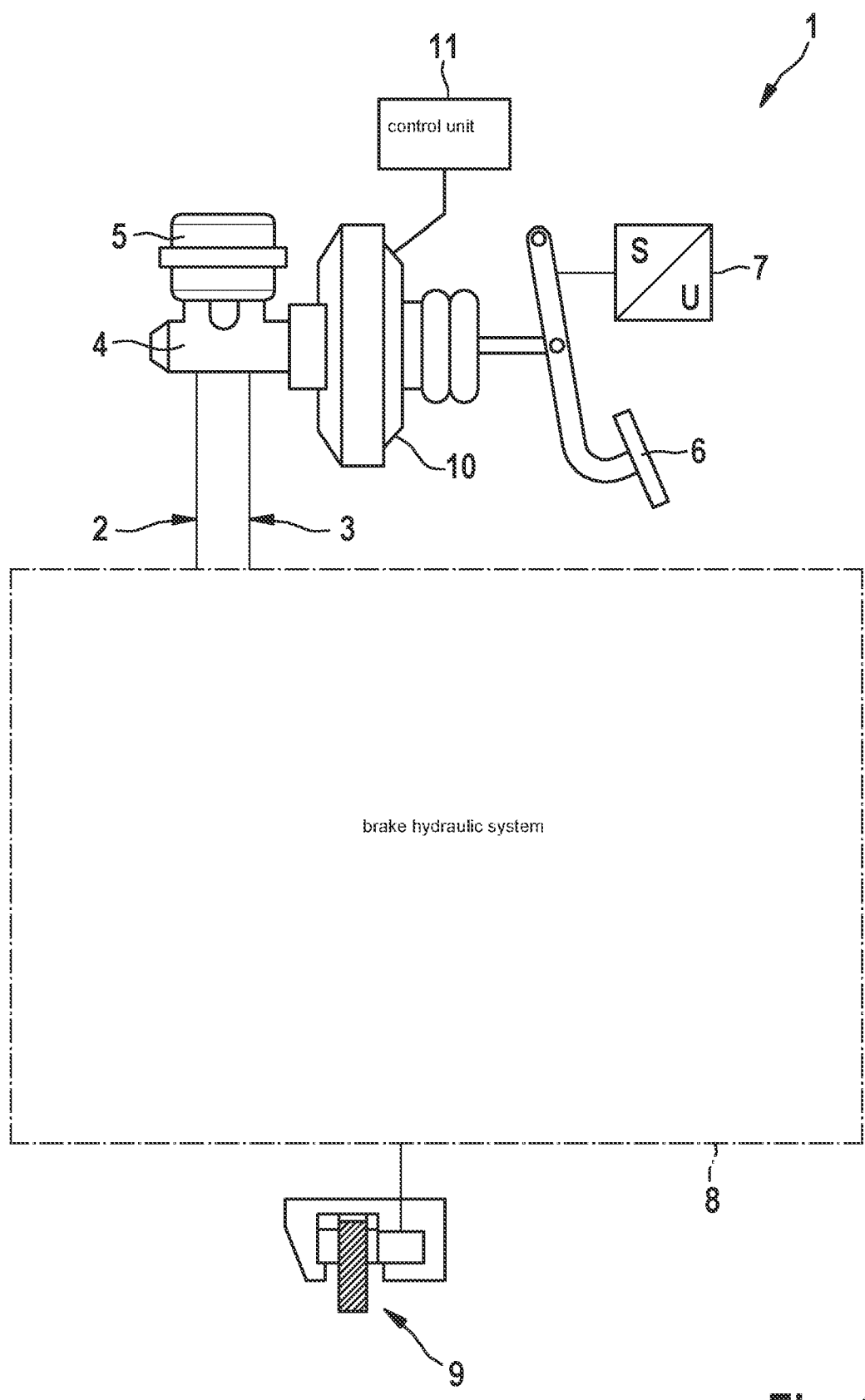
FIG. 1 shows a schematic representation of a hydraulic braking system.

In the figures, identical objects are provided with identical reference numerals.

Hydraulic braking system 1 illustrated in FIG. 1 is designed as a vehicle brake for a vehicle and includes a front axle brake circuit 2 and a rear axle brake circuit 3 for supplying and activating wheel brake devices 9 at each wheel of the vehicle with the aid of a brake fluid under hydraulic pressure. The two brake circuits 2, 3 are connected to a shared main brake cylinder 4, which is supplied with brake fluid via a brake fluid reservoir 5. The main brake cylinder piston within main brake cylinder 4 is actuated by the driver via brake pedal 6, which is measured by the pedal travel effectuated by the driver with the aid of a pedal travel sensor 7. A brake booster 10 is situated between brake pedal 6 and main brake cylinder 4, which includes, for example, an electric motor, which actuates main brake cylinder 4 preferably via a gearing (iBooster).

The actuation of brake pedal 6 measured by pedal travel sensor 7 is transferred as a sensor signal to a control unit 11, in which control signals are generated for activating brake booster 10. The supply of brake fluid to wheel brake devices 9 takes place in each brake circuit 2, 3 via different switching valves, which, together with further assemblies, are part of a brake hydraulic system 8.

The braking system must be adapted to the particular vehicle for completion. For this purpose, the braking system must be parameterized, i.e., different parameters of the braking system are established specific to the vehicle. To keep the complexity for the parameterization as low as possible, and to carry out the parameterization as fast as possible, an automated method is used, in which different brake pressure profiles are predefined as test runs during a test drive operation, and the wheel slip, which thereafter arises at one or multiple wheels of the vehicle, is ascertained and compared with a permissible value range. If the wheel slip is outside the permissible value range, the point in time in the brake pressure profile is determined, at which the brake pressure or the gradient of the brake pressure is the cause of the impermissible wheel slip value. The brake pressure profile is modified, the modified brake pressure profile being predefined as a new test run. The change of the brake pressure profile takes place by modifying at least one parameter, the parameters of the modified brake pressure profile being stored and used permanently for parameterizing the braking system, if the wheel slip value which arises during the modified brake pressure profile is within the permissible value range. The gradient of the wheel slip may also be considered additionally or alternatively to the wheel slip value.

All method steps run automatically in a control unit of the braking system, i.e., the selection of a brake pressure profile, the execution of a test run and the ascertainment of the wheel slip or the gradient of the wheel slip which arises, the determination of the point in time in the brake pressure profile, at which the brake pressure or the gradient of the brake pressure is the cause of the impermissible wheel slip value or the impermissible gradient of the wheel slip, the modification of the brake pressure profile by modifying at least one parameter of the braking system, the execution of a new test run based on the modified brake pressure profile, the determination of the wheel slip value or the gradient of the wheel slip which thereafter arises, and the storage of the parameters of the modified brake pressure profile for the case that the wheel slip value or the gradient of the wheel slip is within the permissible value range.

Figure 2:
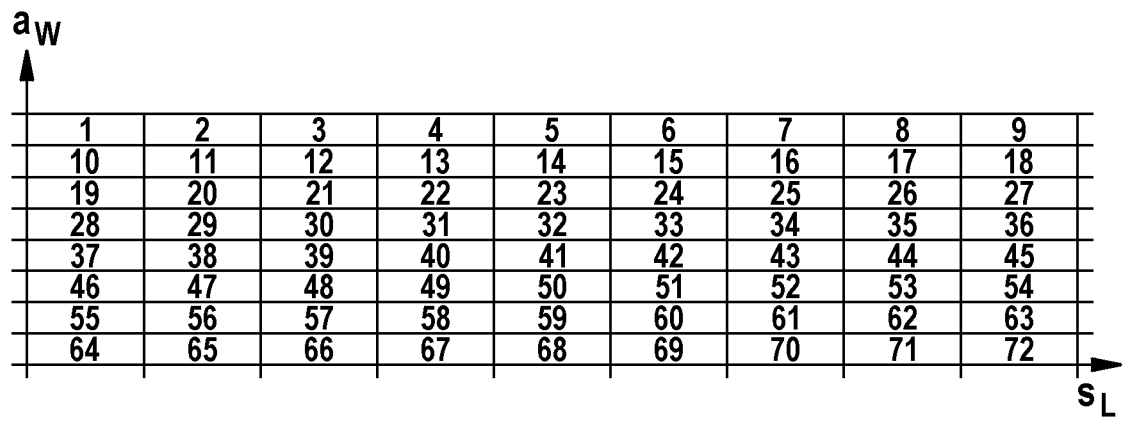
FIG. 2 shows an assignment chart for different brake pressure profiles as a function of the wheel rotational speed change of the wheel slip.

An assignment chart for a multiplicity of value pairs of wheel rotational speed changes $a_W$ (Y axis) and wheel slip $s_L$ (X axis) is illustrated in FIG. 2. A total of 72 different combinations are defined in the exemplary embodiment, each value combination of wheel rotational speed change or wheel acceleration $a_W$ and wheel slip $s_L$ additionally being associated with further system variables or characteristic values, which are assigned to the particular combination. The further system variables or characteristic values are, for example, the derivation of the wheel slip.

Figure 3:
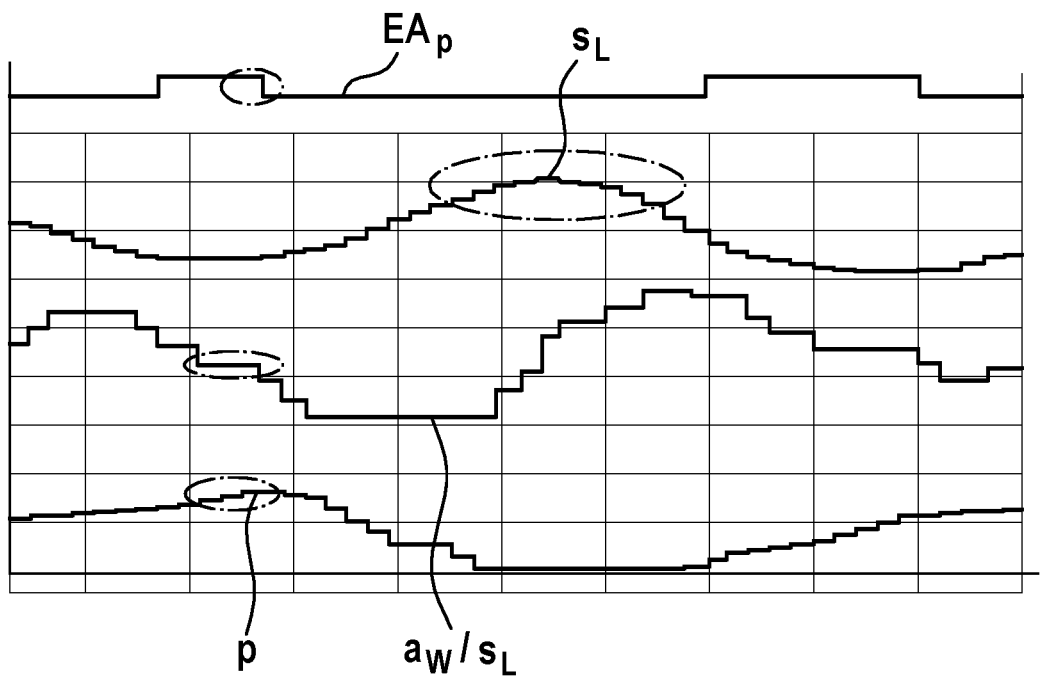
FIG. 3 shows a diagram including the activation/deactivation profile of the brake pressure, including the wheel slip profile, including the profile according to the assignment chart according to FIG. 1, and including the brake pressure profile, FIG. 3 illustrating the case of an excessively high wheel slip.

The time-dependent profile of different characteristic values and system variables of the braking system when specifying a brake pressure profile p is illustrated in FIG. 3. The activation and deactivation of the brake pressure are illustrated by activation/deactivation profile $EA_P$. As a result of brake pressure profile p, a wheel slip $s_L$ arises, to which the profile of assignment chart $a_W/s_L$ according to FIG. 2 is assigned. In the encircled area, wheel slip $s_L$ takes on a maximum, which is above a permissible value range. Consequently, wheel slip $s_L$ is too great at this point.

The cause of the too high wheel slip is found in too high brake pressure p, which is achieved at an earlier point in time, as is also apparent from the encircled positions during the course of activation/deactivation profile $EA_P$ of brake pressure p as well as assignment chart $a_W/s_L$. Brake pressure p reaches too high a maximum. To reduce this maximum and, associated therewith, to also limit maximum wheel slip $s_L$ to a lower value, for example the deactivation point in time of the brake pressure according to profile $EA_P$ may be brought forward, so that the brake pressure is built up only over a shorter period of time. A lower brake pressure p and consequently also a lower wheel slip $s_L$, subsequently arises.

The shortening of the brake pressure buildup represents a parameter, which may be automatically modified according to the method. A changed brake pressure profile may thereafter be predefined as a new test run, on the basis of which wheel slip $s_L$ is ascertained. If maximum wheel slip $s_L$ is now within a permissible magnitude, the corresponding parameters may be permanently stored. The storage takes place under value pair $a_W/s_L$, which is encircled.

Figure 4:
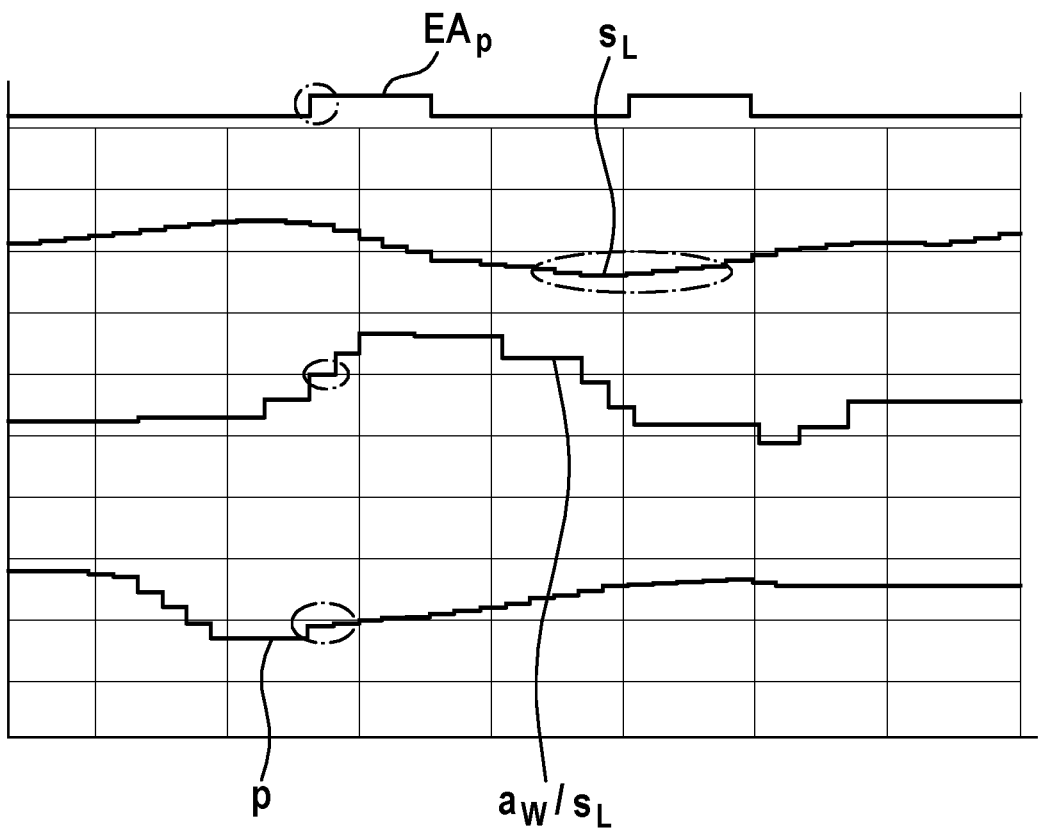
FIG. 4 shows a representation corresponding to FIG. 3, illustrated for too low a brake pressure.

A further exemplary embodiment is illustrated in FIG. 4, in which longitudinal slip $s_L$ of the vehicle wheel takes on a minimum within the encircled area, which is attributable to an excessively low brake pressure p occurring at an earlier time in the area which is also encircled. In the method, brake pressure p may be automatically increased in the brake pressure profile, for example by an earlier activation in activation/deactivation profile $EA_P$ of the brake pressure, after which a higher wheel slip $s_L$ arises. If this higher wheel slip $s_L$ is now within a permissible value range, the parameterization may be permanently stored in the corresponding field in assignment chart $a_W/s_L$.

Figure 5:
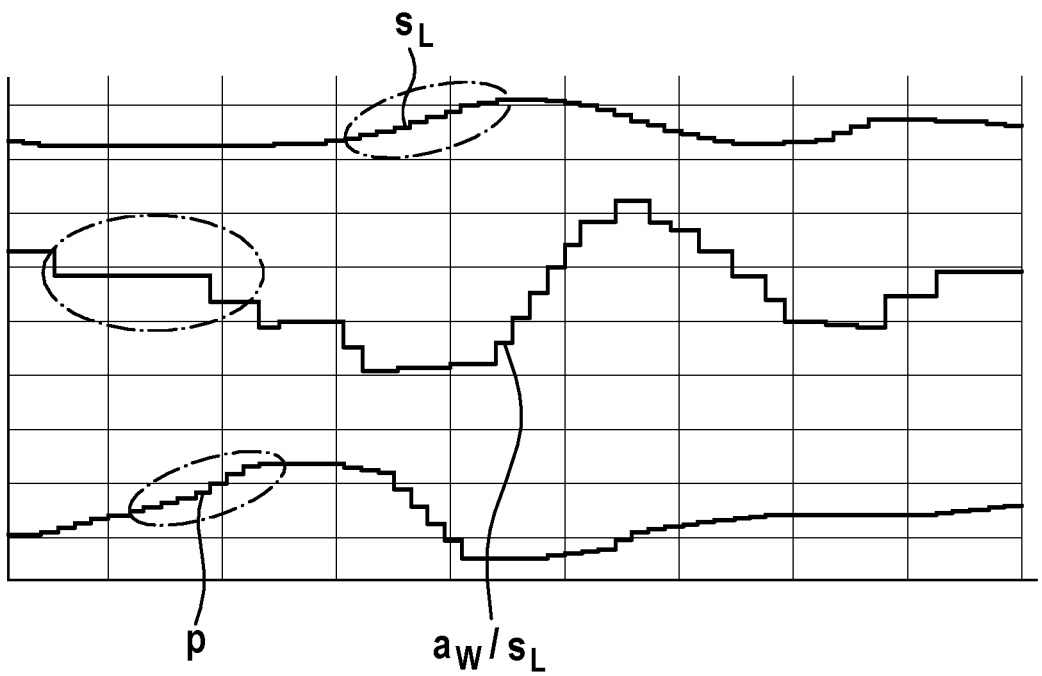
FIG. 5 shows a further representation according to FIGS. 3 and 4 (without activation/deactivation profile of the brake pressure), illustrated for too steep an increase of the wheel slip.

In the further exemplary embodiment according to FIG. 5, the gradient of wheel slip $s_L$ in the encircled area is too high and is thus outside the permissible value range. This is attributable to a corresponding pressure increase in brake pressure profile p in the encircled area, to which the encircled value pair in assignment chart $a_W/s_L$ corresponds. Due to a corresponding reduction of the pressure increase, a reduction of the wheel slip gradient may also be reached, and a lowering of the wheel slip gradient into the permissible value range may be achieved. The corresponding parameterization may be permanently stored in the value pair of assignment chart $a_W/s_L$.

What is claimed is:

1. A method for automatic parameterization of a braking system in a vehicle that has at least one wheel, the method comprising the following steps:
   obtaining a predefined brake pressure profile;
   during a test drive of the vehicle:
      controlling the brake system to perform a braking according to the brake pressure profile that has been predefined; and
      using at least one sensor of the vehicle to ascertain a wheel slip which arises from the brake pressure profile at the at least one wheel of the vehicle;
   determining that a value of the ascertained wheel slip value or of a gradient of the ascertained wheel slip is outside a permissible value range;
   determining a point in time in the brake pressure profile at which a brake pressure or a gradient of the brake pressure is a cause of the value of the ascertained wheel slip or of the gradient of the ascertained wheel slip being outside the permissible value range; and
   based on the determined point in time:
      modifying the obtained predefined brake pressure profile to thereby obtain a modified brake pressure profile; and
      storing brake control parameters corresponding to the modified brake pressure profile in the braking system, the braking system being configured to perform a wheel slip control according to the stored brake control parameters.

2. The method as recited in claim 1, wherein the point in time in the brake pressure profile, at which the brake pressure or the gradient of the brake pressure is the cause of the wheel slip value or the gradient of the wheel slip being outside the permissible value range, is determined directly from the brake pressure profile.

3. The method as recited in claim 1, wherein the point in time in the brake pressure profile, at which the brake pressure or the gradient of the brake pressure is the cause of the wheel slip value or the gradient of the wheel slip being outside the permissible value range, is determined from a system variable other than the brake pressure profile.

4. The method as recited in claim 3, wherein the point is time is determined from an activation/deactivation profile of the brake pressure.

5. The method as recited in claim 1, wherein the brake pressure and/or the gradient of the brake pressure is/are increased or decreased as parameters by the modifying.

6. The method as recited in claim 1, wherein at least one parameter characterizing the brake pressure profile is changed by an established absolute amount by the modifying.

7. The method as recited in claim 1, wherein the predefined brake pressure profile is assigned to a particular wheel rotational speed change/wheel slip combination.

8. The method as recited in claim 7, wherein the predefined brake pressure profile depends on further characteristic values or system variables, including a wheel slip change or an abrupt change in wheel rotational speed.

9. The method as recited in claim 1, wherein the test drive is performed as a real vehicle operation on a road.

10. The method as recited in claim 1, wherein the test drive is performed on a roller dynamometer.

11. A control unit for activating settable components of a braking system in a vehicle that has at least one wheel, the control unit configured to automatically parameterize the braking system, the control unit configured to:
obtain a predefined brake pressure profile;
during a test drive of the vehicle:
control the brake system to perform a braking according to the brake pressure profile that has been predefined; and
use at least one sensor of the vehicle to ascertain a wheel slip which arises from the brake pressure profile at the at least one wheel of the vehicle;
determine that a value of the ascertained wheel slip or of a gradient of the ascertained wheel slip is outside a permissible value range;
determine a point in time in the brake pressure profile at which a brake pressure or a gradient of the brake pressure is a cause of the value of the ascertained wheel slip or of the gradient of the ascertained wheel slip being outside the permissible value range; and
based on the determined point in time:
modify the obtained predefined brake pressure profile to thereby obtain a modified brake pressure profile; and
store brake control parameters corresponding to the modified brake pressure profile in the braking system, the braking system being configured to perform a wheel slip control according to the stored brake control parameters.

12. A braking system in a vehicle that has at least one wheel, the braking system comprising:
a control unit for activating settable components of the braking system, the control unit configured to automatically parameterize the braking system, the control unit configured to:
obtain a predefined brake pressure profile;
during a test drive of the vehicle:
control the brake system to perform a braking according to the brake pressure profile that has been predefined; and
use at least one sensor of the vehicle to ascertain a wheel slip which arises from the brake pressure profile at the at least one wheel of the vehicle;
determine that a value of the ascertained wheel slip or of a gradient of the ascertained wheel slip is outside a permissible value range;
determine a point in time in the brake pressure profile at which a brake pressure or a gradient of the ascertained pressure is a cause of the value of the ascertained wheel slip or of the gradient of the ascertained wheel slip being outside the permissible value range; and
based on the determined point in time:
modify the obtained predefined brake pressure profile to thereby obtain a modified brake pressure profile; and
store brake control parameters corresponding to the modified brake pressure profile in the braking system, the braking system being configured to perform a wheel slip control according to the stored brake control parameters.

13. A vehicle that has at least one wheel, the vehicle comprising:
a braking system including a control unit for activating settable components of the braking system, the control unit configured to automatically parameterize the braking system, the control unit configured to:
obtain a predefined brake pressure profile;
during a test drive of the vehicle:
control the brake system to perform a braking according to the brake pressure profile that has been predefined; and
use at least one sensor of the vehicle to ascertain a wheel slip which arises from the brake pressure profile at the at least one wheel of the vehicle;
determine that a value of the ascertained wheel slip or of a gradient of the ascertained wheel slip is outside a permissible value range;
determine a point in time in the brake pressure profile at which a brake pressure or a gradient of the brake pressure is a cause of the value of the ascertained wheel slip or of the gradient of the ascertained wheel slip being outside the permissible value range; and
based on the determined point in time:
modify the obtained predefined brake pressure profile to thereby obtain a modified brake pressure profile; and
store brake control parameters corresponding to the modified brake pressure profile in the braking system, the braking system being configured to perform a wheel slip control according to the stored brake control parameters.

14. A non-transitory machine-readable storage on which is stored a computer program for automatic parameterization of a braking system in a vehicle that has at least one wheel, the computer program, when executed by a control unit, causing the control unit to perform the following steps:
obtaining a predefined brake pressure profile;
during a test drive of the vehicle:
controlling the brake system to perform a braking according to the brake pressure profile that has been predefined; and
using at least one sensor of the vehicle to ascertain a wheel slip which arises from the brake pressure profile at the at least one wheel of the vehicle;
determining that a value of the ascertained wheel slip or of a gradient of the ascertained wheel slip is outside a permissible value range;
determining a point in time in the brake pressure profile at which a brake pressure or a gradient of the brake pressure is a cause of the value of the ascertained wheel slip or of the gradient of the ascertained wheel slip being outside the permissible value range; and
based on the determined point in time:
modifying the obtained predefined brake pressure profile to thereby obtain a modified brake pressure profile; and
storing brake control parameters corresponding to the modified brake pressure profile in the braking system, the braking system being configured to perform a wheel slip control according to the stored brake control parameters.

* * * * *